US011906633B2

United States Patent
Broumandan et al.

(10) Patent No.: US 11,906,633 B2
(45) Date of Patent: Feb. 20, 2024

(54) SYSTEM AND METHOD FOR NAVIGATION SYSTEM SPOOFING DETECTION USING A PLURALITY OF ANTENNAS

(71) Applicant: NovAtel Inc., Calgary (CA)

(72) Inventors: Ali Broumandan, Calgary (CA); Thomas Taylor, League City, TX (US)

(73) Assignee: NovAtel Inc., Calgary (CA)

( * ) Notice: Subject to any disclaimer, the term of this patent is extended or adjusted under 35 U.S.C. 154(b) by 127 days.

(21) Appl. No.: 17/522,382

(22) Filed: Nov. 9, 2021

(65) Prior Publication Data

US 2023/0142516 A1 May 11, 2023

(51) Int. Cl.
G01S 19/21 (2010.01)
G01S 19/29 (2010.01)

(52) U.S. Cl.
CPC ............ G01S 19/215 (2013.01); G01S 19/29 (2013.01)

(58) Field of Classification Search
CPC ................................ G01S 19/215; G01S 19/29
See application file for complete search history.

(56) References Cited

U.S. PATENT DOCUMENTS

| | | | | |
|---|---|---|---|---|
| 7,310,062 | B1 * | 12/2007 | Hwang | G01S 19/215 342/357.59 |
| 9,971,037 | B2 * | 5/2018 | Dickman | G01S 19/23 |
| 11,092,716 | B1 | 8/2021 | Pust et al. | |
| 11,442,175 | B2 * | 9/2022 | Bodenheimer | G01S 19/21 |
| 2019/0204451 | A1 | 7/2019 | Boyer et al. | |
| 2021/0333410 | A1 | 10/2021 | Gum et al. | |
| 2021/0341627 | A1 | 11/2021 | Broumandan | |
| 2023/0111059 | A1 * | 4/2023 | Revol | G01S 19/36 455/1 |

FOREIGN PATENT DOCUMENTS

| | | | | |
|---|---|---|---|---|
| CN | 110673168 | A | 1/2020 | |
| EP | 2746813 | A1 * | 6/2014 | ........... G01S 19/215 |
| EP | 3627190 | A1 | 3/2020 | |

OTHER PUBLICATIONS

Kaplan, Elliott D. et al., "Understanding GPS Principles and Applications", Artech House, 2nd ed., 2006 (Year: 2006) (Year: 2006).*

(Continued)

*Primary Examiner* — Cassi J Galt
(74) *Attorney, Agent, or Firm* — Cesari and McKenna, LLP (57) ABSTRACT

A system and method for detecting spoofing of a navigation system (NS) using a plurality of antennas. Carrier phase and $CN_0$ measurements are obtains of a plurality of signals. The measurements are then double differenced and compared to predefined thresholds to determine whether a signal is authentic or not. Once sufficient authentic signals are identified, position and time is determined using the authenticated signals. Residuals are estimated for all signals. An average value of the residuals or the authenticated signals is calculated and is then removed from the residuals of the unauthenticated signals. Should the remainder exceed a predefined threshold, the signal is deemed to be spoofed. Otherwise, the signal is deemed to be authentic.

14 Claims, 7 Drawing Sheets

(56) References Cited

OTHER PUBLICATIONS

Borio et al., "A Dual-Antenna Spoofing Detection System Using GNSS Commercial", Receivers Proceedings of the 28th International Technical Meeting of The Satellite Division of the Institute of Navigation, Sep. 2015, pp. 1-6.

Borio, Daniele, et al., "A Sum-of-Squares Approach to GNSS Spoofing Detection," IEEE, IEEE Transactions on Aerospace and Electronic Systems, vol. 52, No. 4, Aug. 2016, pp. 1756-1768.

"European Search Report and Written Opinion," European Application No. 21171475.3-1216, Applicant: NovAtel Inc., dated Sep. 13, 2021, pp. 1-11.

Jahromi, Ali Jafarnia, et al., "A Double Antenna Approach Toward Detection, Classification and Mitigation of GNSS Structural Interface," Proceedings of the Navitec 2014, Noordwijk, The Netherlands, Dec. 3-5, 2014, pp. 1-8.

Jahromi, Ali Jafarnia, et al., "GNSS Signal Authenticity Verification Using Carrier Phase Measurements with Multiple Receivers," IEEE, Proceedings of the Navitec 2016, ESA/ESTEC, Noordwijk, The Netherlands, Dec. 14-16, 2016, pp. 1-11.

Jahromi, Ali Jafarnia, et al., "GNSS Signal Authenticity Verification Using Carrier Phase Measurements with Multiple Receivers," IEEE, 2016 8th ESA Workshop on Satellite Navigation Technologies and European Workshop on GNSS Signals and Signal Processing (Navitec), Dec. 14, 2016, pp. 1-11.

Psiaki, Mark L., et al., "GNSS Spoofing and Detection," IEEE, Proceedings of the IEEE, vol. 104, Issue 6, Apr. 1, 2016, pp. 1-11.

Psiaki, Mark L., et al., "GNSS Spoofing and Detection," IEEE, Proceedings of the IEEE, New York, US, vol. 104, No. 6, Jun. 6, 2016, pp. 1258-1270.

Psiaki, Mark L., et al., "GNSS Spoofing Detection Using Two-Antenna Differential Carrier Phase," ION Institute of Navigation, Proceedings of the 27th International Technical Meeting of the Satellite Division of The Institute of Navigation (Ion GNSS+ 2014), Sep. 8-12, 2014, Tampa, Florida, USA, pp. 1-25.

Seo, Seong-Hun, et al., "Efficient Spoofing Identification Using Baseline Vector Information of Multiple Receivers," Springer, Springer-Verlag GmbH Germany, Springer Nature, GPS Solutions, Aug. 22, 2018, pp. 1-14.

Stenberg, Niklas, et al., "GNSS Spoofing Mitigation Using Multiple Receivers," IEEE, 2020 IEEE/ION Position, Location and Navigation Symposium (Plans), Apr. 20, 2020, pp. 555-565.

Swaszek, Peter F., et al., "Spoof Detection Using Multiple COTS Receivers in Safety Critical Applications," The University of Rhode Island, Department of Electrical, Computer, and Biomedical Engineering Faculty Publications, Proceedings of Ion GNSS+ 2013, Nashville, TN, USA, Sep. 2013, pp. 1-11.

U.S. Appl. No. 16/864,904, filed May 1, 2020 by Ali Broumandan for System and Method for Detecting Spoofing of Global Navigation Satellite System Signals Using a Plurality of Antennas, pp. 1-37.

U.S. Appl. No. 17/166,371, filed Feb. 3, 2021 by Ali Broumandan for System and Method for Detecting Spoofing of Global Navigation Satellite System Signals Using a Single Antenna, pp. 1-32.

Esswein Michael C et al. GNSS Anti-Spoofing for a Multi-Element Antenna Array: GNSS 2019—Proceedings of the 32nd International Technical Meeting of the Satellite Division of the Institute of Navigation (Ion GNSS+ 2019), The Institute of Navigation, 8551 Rixlew Lane Suite 360 Manassas, VA 20109, USA, Sep. 20, 2019, pp. 3197-3214.

European Search Report and Written Opinion dated Apr. 13, 2023 for European Patent Application No. 22195936.4 for Novatel, Inc., 10 pages.

Reckeweg, Florian. Integer ambiguity resolution for multi-GNSS and multi-signal raw phase observations. Dissertation, Darmstadt, Technische Universität Darmstadt, 2019, 2020, p. 14.

\* cited by examiner

SYSTEM AND METHOD FOR NAVIGATION SYSTEM SPOOFING DETECTION USING A PLURALITY OF ANTENNAS

CROSS-REFERENCE TO RELATED APPLICATIONS

The present application is related to the following commonly assigned U.S. patent application Ser. No. 16/864,904, which was filed on May 1, 2020, by Ali Broumandan for SYSTEM AND METHOD FOR DETECTING SPOOFING OF GLOBAL NAVIGATION SATELLITE SYSTEM SIGNALS USING A PLURALITY OF ANTENNAS.

BACKGROUND

Technical Field

The present relates to navigation systems that utilize a plurality of transmitters for position and time estimation and more particularly to the detection of spoofing attacks on such systems.

Background Information

Navigation Satellite Systems (NSS) are utilized for a variety of purposes, many of which have strict reliability requirements as they involve safety of life (SoL) services associated with critical missions such as aviation, maritime, and/or land transportation. For example, autonomous vehicle navigation requires accurate and precise positioning information to avoid the vehicle impacting with other vehicles, pedestrians, and/or structures. Similarly, navigating a vessel through a specified maritime channel requires accurate position information to avoid shallow areas, underwater wrecks, etc. Spoofing and/or jamming attacks on NSS receivers have become a serious threat to these critical applications of NSS position information.

As used herein, a jamming attack is generally defined as the broadcasting of signals on NSS frequencies that overwhelm the legitimate NSS signals and aim to prevent a NSS receiver from determining a position. Similarly, as used herein, a spoofing attack is generally defined as the broadcasting of fake NSS signals that are designed to cause a receiver to determine an incorrect position. Both attacks may occur simultaneously, i.e., spoofing signals may be transmitted with such a high power that they initially cause a receiver to lose tracking of the satellite signals, thereby resulting in a jamming attack. The spoofing signals may then be reduced in power so that the receiver locks onto the spoofing signal and utilizes the spoofing signal to calculate position.

It is desirous for NSS receivers to be capable of identifying when a spoofing attack is occurring so that the NSS receiver, or another component that is using the NSS position information, may perform appropriate remediation. For example, if a receiver determines that it is receiving spoofed signals, it may cease to output position information, thereby preventing incorrect position information from being utilized in a manner that could cause harm. Additionally, should a receiver determine that it is being spoofed, appropriate countermeasures may be utilized to reduce the impact of the spoofer.

In addition to a NSS being spoofed, terrestrial based navigation systems (NS) that provide position and/or time estimates may be spoofed. Similar concerns regarding spoofed terrestrial based systems arise as in the case for an NSS.

SUMMARY

The disadvantages of the prior art are overcome by the disclosed system and method for Navigation Satellite System (NSS) spoofing detection using a plurality of antennas. Exemplary embodiments of the invention are described in relation to Navigation Satellite Systems (NSS), such as a Global Navigation Satellite System (GNSS). However, it is expressly contemplated that the principles of the present invention may be utilized in any navigation system (NS) that utilizes a plurality of transmitters. Such transmitters may be satellite based, terrestrial based, or a combination thereof.

Carrier phase measurements are obtained for all visible ranging codes, which are pseudorandom noise (PRNs). Double differencing of the carrier phase measurements are made of each pair of PRNs as well as double differencing for $C/N_0$. If any of the double differenced values are within a predefined threshold, the PRNs involved are not authenticated. Otherwise, the PRNs are deemed to be authenticated. Once at least sufficient PRNs are authenticated, all PRNs along with a weighting vector are passed to a position estimate engine for residual analysis.

Position and time are estimated using the authenticated PRNs. The residuals are estimated for all PRNs, including the authenticated and unauthenticated PRNs. An average value of the residuals for the authenticated PRNs is calculated. This average value is removed from the residuals of the unauthenticated PRNs. The remainder is compared to a predefined threshold. Should the remainder exceed the threshold, the PRN is deemed to be spoofed, otherwise it is deemed authenticated.

BRIEF DESCRIPTION OF THE DRAWINGS

The description below refers to the accompanying drawings, in which like reference numerals indicate identical or functionally identical elements, of which.

DETAILED DESCRIPTION OF AN ILLUSTRATIVE EMBODIMENT

Figure 1:
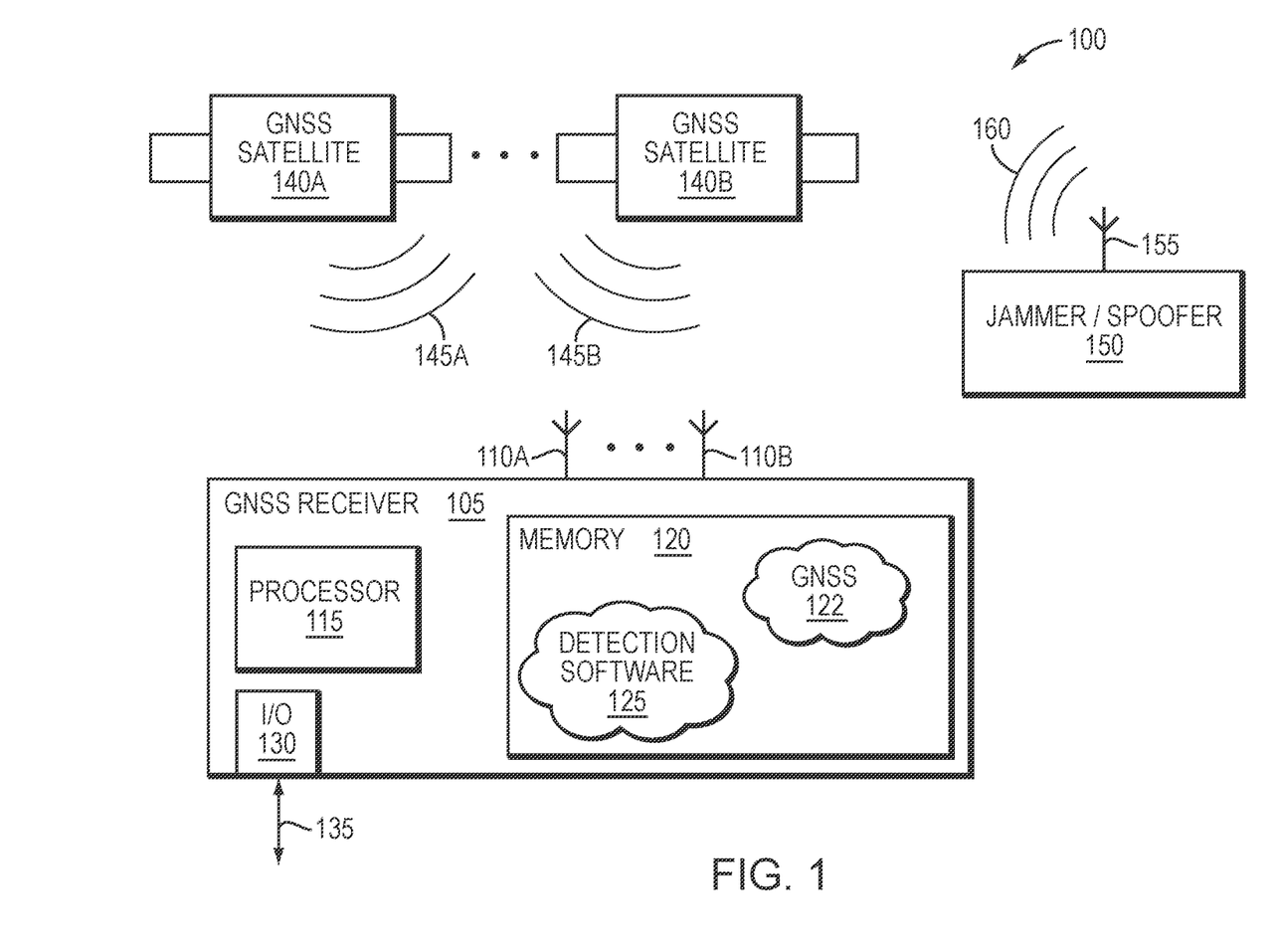
FIG. 1 is a diagram of an exemplary Navigation Satellite System (NSS) environment in accordance with an illustrative embodiment of the present invention.

FIG. 1 is a diagram of an exemplary Navigation Satellite System (NSS) environment 100 in accordance with an illustrative embodiment of the present invention. Environment 100 illustratively comprises a NSS receiver 105, a plurality of NSS satellites 140A, 140B, and an exemplary jammer/spoofer 150.

A plurality of NSS systems are currently in operation, e.g., GPS, GLONASS, BeiDou, and Galileo. The illustrative NSS satellites 140 transmit exemplary NSS signals 145. Typically, the NSS satellites 140 broadcast the NSS signals 145 on a plurality of frequencies, e.g., L1, L2, L5, etc. Illustratively, the carriers of signals 145 are modulated by ranging codes, which are pseudorandom noise (PRNs). A unique PRN is selected for transmission by each satellite, 140A, 140B. A satellite may change which PRN code it transmits over time, but only one satellite transmits a particular PRN code at a given time. NSS signals 145 also include navigational data, which may include data on the satellite health status, ephemeris (i.e., satellite position and velocity), clock bias parameters, and an almanac giving data on all satellites in the NSS constellation.

A typical NSS receiver receives a composite signal consisting of several signals 145 transmitted by the satellites, as well as any noise and interfering signals, such as spoofing signal 160, described further below. A receiver may recover one of the transmitted signals 145 by correlating the composite received signal with a locally generated reference version of the PRN code signal assigned to the particular satellite of interest. If the locally generated PRN reference signal is properly timed, the digital data from that satellite may then be properly detected.

Exemplary jammer/spoofer 150 utilizes an antenna 155 to broadcast a set of spoofing signals 160. The spoofing signals 160 may modulate the carrier with information that conforms to a NSS standard. However, the spoofing signals may include falsified PRNs and/or incorrect navigation data, e.g., almanac and/or ephemeris data. The purpose of spoofing signals 160 is to cause receiver 105 to determine an incorrect position and/or time. A determination of a position/time that is incorrect may have severe safety of life consequences if, e.g., a crash occurs due to the incorrect position. For example, in an aircraft navigation environment, spoofing signals 160 may cause a receiver 105 to determine an incorrect position. An aircraft relying on such incorrect position information may impact with terrain.

The illustrative receiver 105 includes one or more exemplary antennas 110A, B that are utilized by the receiver 105 for receiving NSS signals 145A, B from the various NSS satellites 140A, B. Further, if a jammer/spoofing 150 is broadcasting a spoofing signal 160, antennas 110 may also receive the spoofing signal 160. The antennas 110 may also receive other signals, such as interference, noise, etc. Illustratively, the receiver 105 receives NSS signals 145 at antennas 110 and utilizes well-known techniques to calculate various navigation information including, e.g., position, velocity, etc.

Receiver 105 illustratively comprises of a processor 115, a memory 120 and, in alternative embodiments, an input/output (I/O) module 130. In alternative embodiments, the receiver 105 may comprise additional components (not shown) to implement the functionality described herein in hardware. Such components may comprise, e.g., correlators, ASICs, FPGAs, etc. Therefore, the description of specific components described herein should be taken as exemplary only. As will be appreciated by those skilled in the art, received NSS signals are typically amplified, down converted, filtered, and converted to a digital format. These functions may be performed in specialized hardware (not shown).

The processor 115 executes various software including exemplary detection software 125 that may be stored in memory 120. Exemplary detection software 125 implements the various spoofing detection techniques described herein in accordance with illustrative embodiments of the present invention. The detection software 125 may interact with NSS software 122 that illustratively implements conventional position determination functionality. Illustratively, the NSS software 122 may operate on the digital representation of the received NSS signal. While detection software 125 is shown as separate from GNNS software 122, it is expressly contemplated that they may be integrated into a single software application. Therefore, the description of separate software and/or modules should be taken as exemplary only.

The I/O module 130 may send/receive commands and/or navigation information over link 135. For example, I/O module 130 may communicate over link 135 with a control system for an autonomous vehicle to provide position and/or velocity information. It should be noted that in alternative embodiments, the functionality of I/O module 130 may be implemented using other components. For example, a user interface (UI) for receiver commands and/or calibration data may be utilized, while a separate data link is utilized to output position information.

It should be noted that while the exemplary receiver 105 is shown and described as having a processor 115 and memory 120, in alternative embodiments of the present invention, the various functionalities described herein may be implemented in other manners. For example, the functionality may be implemented in hardware, firmware, software, or in any combination thereof. Therefore, the description of the various illustrative embodiments of spoofing detection being implemented by operation of detection software 125 being executed by processor 115 should be taken as exemplary only.

As noted above, NSS receivers are vulnerable to structural interference signals such as spoofing. The spoofing attack is illustratively based on a set of synthesized NSS signals that causes receivers to generate incorrect position information. An exemplary spoofer 150 generate a plurality of NSS signals and transmits them using antenna 155. As a single antenna 155 is used, the spoofing PRNs are spatially correlated as they experience the same propagation. Prior art techniques that utilize a plurality of antennas to authenticate received signals exist. However, a noted disadvantage of such authentication procedures is that they may take a significant amount of time, e.g., several minutes, to authenticate all the signals.

While FIG. 1 is written in terms of a NSS, it is expressly contemplated that the principles of the present invention may be utilized in non-NSS systems, such as, for example, a terrestrial based navigation system (NS), or a hybrid NS that utilizes both terrestrial and satellite transmitters. Therefore, the description of a NSS should be taken as exemplary only.

The phase observation equation from satellite j to antenna 1 can be shown as $$\Phi_1^j = \rho_1^j + d\rho_n + c(dt^j - dT) + \lambda N_1^j - d_{ion}^j + d_{trop}^j + \varepsilon(\Phi_{MP_1}^j) + \varepsilon(\Phi_{rx})$$

where:

$\Phi_1^j$ is the phase observation from antenna 1 to satellite j (m),
$\rho_1^j$ is the geometric range from antenna 1 to satellite j (m),
$d\rho_n$ is satellite broadcast orbital error (m),
c is the speed of light (m/s),
$dt^j$ is the satellite j clock error (s),
dT is the receiver clock error (s),
$\lambda$ is the carrier wavelength (m),
$N_1^j$ is the integer cycle ambiguity (cycles),
$d_{ion}^j$ is the ionospheric delay error (m),
$d_{itrop}^j$ is the tropospheric delay error (m),
$\varepsilon(\Phi_{MP_1}^j)$ is the phase multipath error (m), and
$\varepsilon(\Phi_{rx})$ is the receiver noise (m).

Similarly, the phase observation equation for antenna 2 is:

$$\Phi_2^j = \rho_2^j + d\rho_n + c(dt^j - dT) + \lambda N_2^j - d_{ion}^j + d_{trop}^j + \varepsilon(\Phi_{MP_2}^j) + \varepsilon(\Phi_{rx})$$

Differencing the two antenna phase observations for the same satellite j, provides single differenced phase equation. Single difference removes satellite clock and atmospheric terms (due to short baseline between the antennas), if the same clock is used for both receivers, clock error also is cancelled. However, differencing will also increase the error due to multipath and receiver noise. Single difference phase measurements can be written as $$\Delta\Phi_{2-1}^j = \Delta\rho_{2-1}^j + \lambda N_{2-1}^j + \Delta\varepsilon(\Phi_{MP_{2,1}}^j) + \Delta\varepsilon(\Phi_{rx})$$

$N_{2-1}^j$ is the difference between integer carrier cycle ambiguities of two receivers and this value is assumed to be constant within the observation interval. $\Delta\varepsilon(\Phi_{rx})$ is the noise term corresponding to the phase observation single difference and it is assumed that the statistics of this term remain constant during the observation interval. $\Delta\rho_{2-1}$ can be written as $$\Delta\rho_{2-1}^j = da^T c^j$$

$$a = \begin{bmatrix} \cos(\theta_a)\sin(\varphi_a) \\ \cos(\theta_a)\cos(\varphi_a) \\ \sin(\theta_a) \end{bmatrix}$$

$$c^j = \begin{bmatrix} \cos(\theta_j)\sin(\varphi_j) \\ \cos(\theta_j)\cos(\varphi_j) \\ \sin(\theta_j) \end{bmatrix}$$

One of the antennas is considered as the reference of an East, North, Up (ENU) local frame coordinate system. a represents the pointing vector from reference antenna to the second antenna, and $c^j$ is the pointing vector towards the source of the jth PRN. $\theta_j$ and $\varphi_j$ refer to the elevation and azimuth angles of the jth PRN source in the local coordinate frame $\theta_a$ $\varphi_a$ are the elevation and azimuth angles of the second antenna with respect to the reference antenna. As shown the magnitude of $\Delta\rho_{2-1}$ is a function of the antenna spacing, d, and the azimuth and elevation angles of incident signals with respect to the antenna baseline.

$\Delta\rho_{2-1}$ is time invariant for a static spoofing source and fixed receiver antennas assembly since the relative direction of arrival of the spoofing signals with respect to the antenna baseline does not change over time. However, in the authentic case, $\Delta\rho_{2-1}^j$ changes as the azimuth and elevation angles of each satellite changes. As such, $\Delta\Phi_{2-1}^j$ between receivers' single difference carrier phase observations can be used to classify authentic and spoofing signals when the angle of arrival of the spoofer with respect to the antenna baseline is constant. In the spoofing case, signals should have the same and constant single differenced carrier phase values whereas the authentic signals may have different and time variant single differenced carrier phase values.

Figure 2:
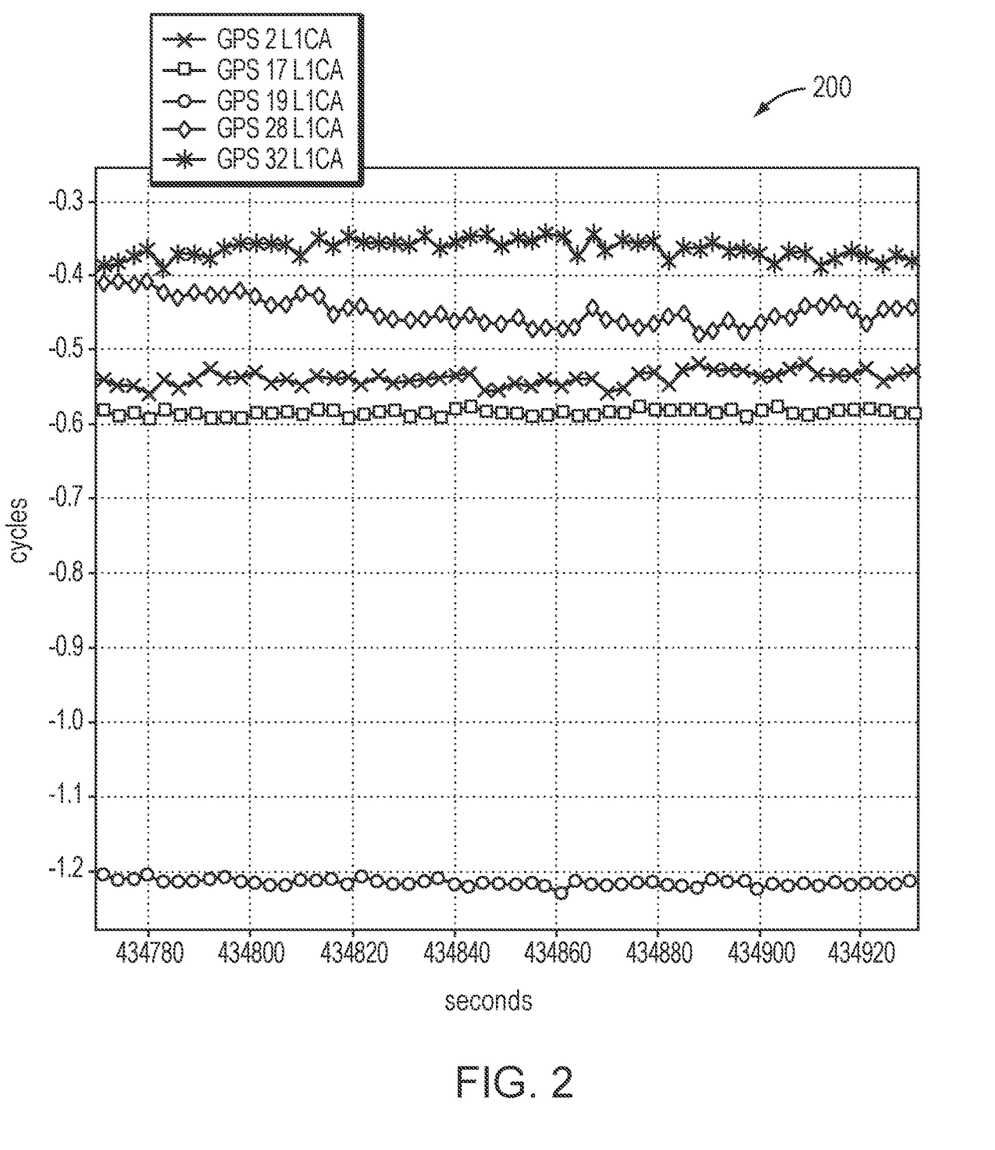
FIG. 2 is a graph illustrating the results of double differencing for authentic NSS signals in accordance with an illustrative embodiment of the present invention.

FIG. 2 is a graph illustrating the results of single differencing for authentic NSS signals in accordance with an illustrative embodiment of the present invention. FIG. 2 illustrates between antenna carrier phase difference (D-ADR $\Delta\Phi_{2-1}^j$) for 15 cm antenna baseline for authentic case. In this example a dual antenna NovAtel OEM 7720 receiver was used. As shown, different PRNs have different single differenced carrier phase values. This suggests that these PRNs are arriving from different angles.

Another important factor affecting the performance of the spoofing detection and signal classification is the distance between two antennas. The $\Delta\Phi_{2-1}^j$ value is a function of the antenna spacing d. A longer antenna spacing results in faster variation in $\Delta\Phi_{2-1}^j$ and $\nabla\Delta\Phi_{2-1}^{j-m}$ (described further below) which is beneficial for the methods relying on slope detection of single and double difference observations.

Figure 3:
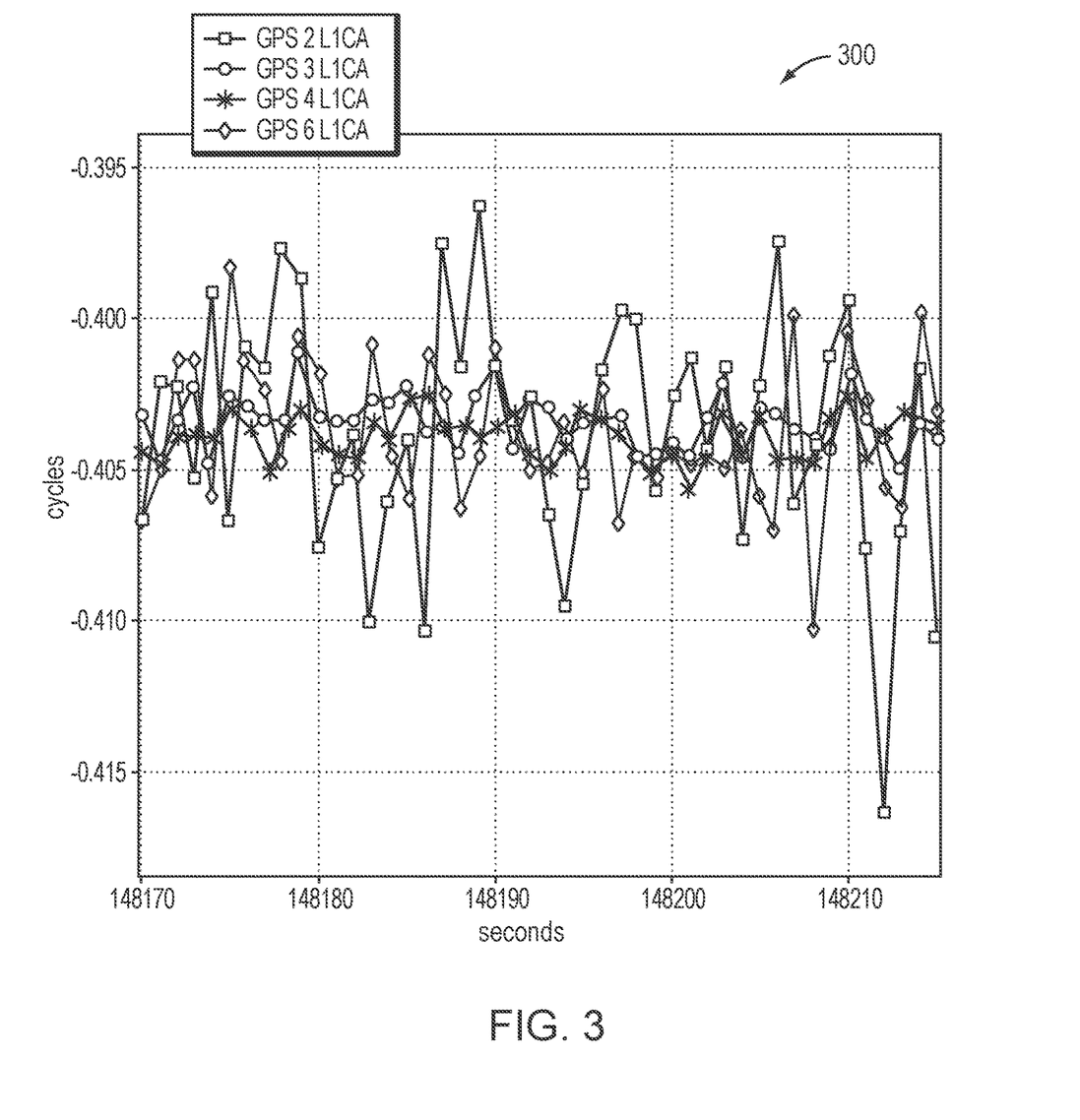
FIG. 3 is a graph illustrating the results of double differencing for spoofing NSS signals in accordance with an illustrative embodiment of the present invention.

FIG. 3 is a graph illustrating the results of single differencing for spoofing NSS signals in accordance with an illustrative embodiment of the present invention as shown. All PRNs have the same single differenced carrier phase value and there is no trend in the values.

Carrier phase double difference is the difference between the single difference of carrier phase observations corresponding to two different satellite measurements. The carrier phase double difference between the $m^{th}$ and the $j^{th}$ PRNs can be written as $$\nabla\Delta\Phi_{2-1}^{j-m} = \Delta\Phi_{2-1}^j - \Delta\Phi_{2-1}^m = \nabla\Delta\rho_{2-1}^{j-m} + \lambda\nabla\Delta N_{2-1}^{j-m} + \nabla\Delta\varepsilon\left(\Phi_{MP_{2,1}}^{j-m}\right)$$

where $\nabla\Delta N_{2-1}^{j-m}$ represents the double difference integer ambiguities, assumed to be a constant value during the observation interval. $\nabla\Delta\varepsilon(\Phi_{MP_{2,1}}^{j,m})$ is the double difference observation noise whose statistics are also assumed constant during the observation interval. In the case that the $j^{th}$ and $m^{th}$ PRNs are both transmitted from the same antenna, $\nabla\Delta\rho_{2-1}^{j-m}$ becomes zero since these PRNs have the same azimuth and elevation angles with respect to the antenna baseline over time. As such, in the spoofing case where the spoofer uses a single transmitter source the carrier phase double difference becomes zero mean, while in the case of authentic signals, the double difference value changes due to the change in the relative azimuth and elevation angles of satellites. This metric does not impose any condition on the relative dynamics between the spoofing source and the antenna assembly.

Figure 4:
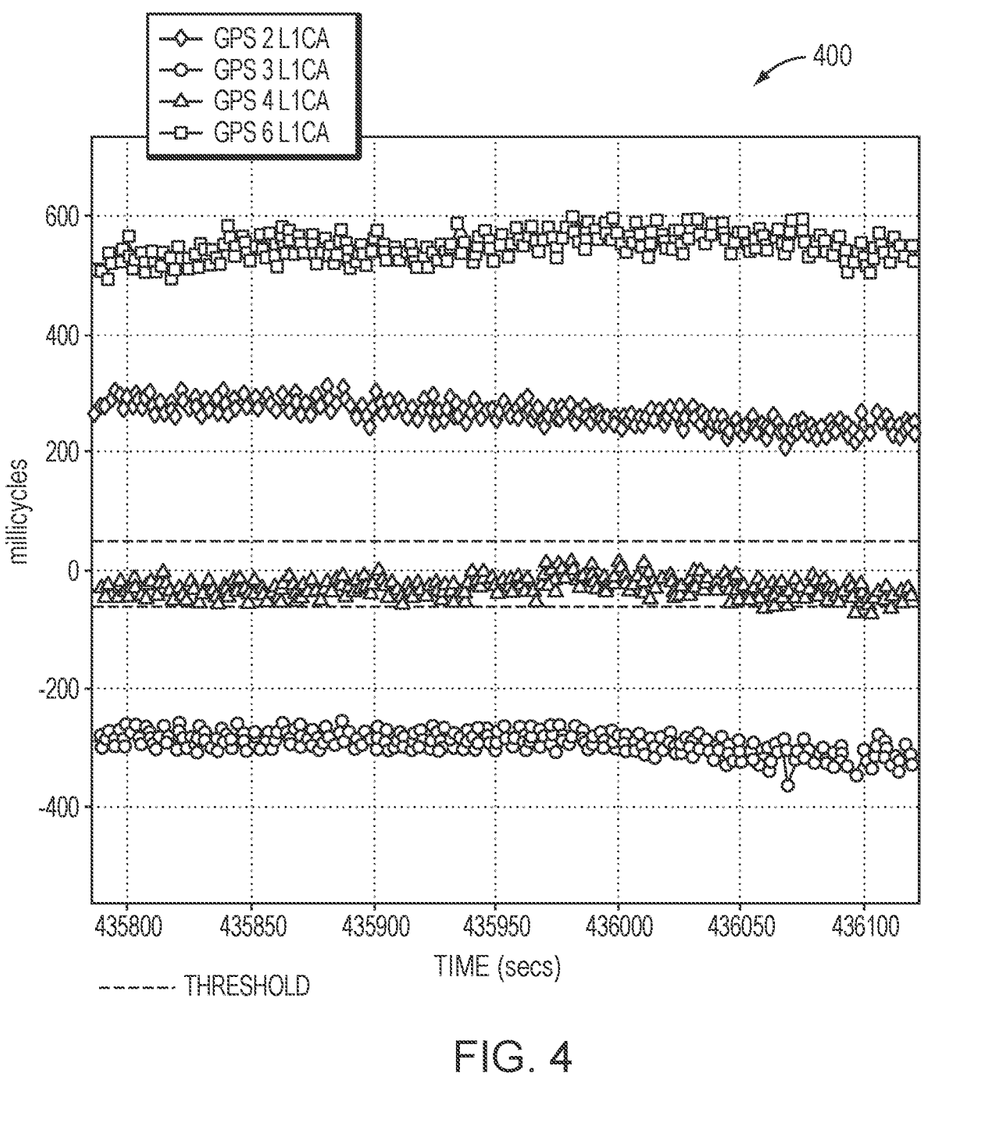
FIG. 4 is a graph illustrating the results of double differencing of carrier phase measurements for authentic NSS signals in accordance with an illustrative embodiment of the present invention.

FIG. 4 shows results of double differencing of carrier-phase measurements in the authentic case. The integer part of carrier phase measurements after the double differencing (DD) process has been removed. As shown, the double difference of carrier phase measurements plot in case of authentic signals are non-zero time varying. FIG. 4 shows an arbitrary threshold (T) of −/+0.05 cycle.

Figure 5:
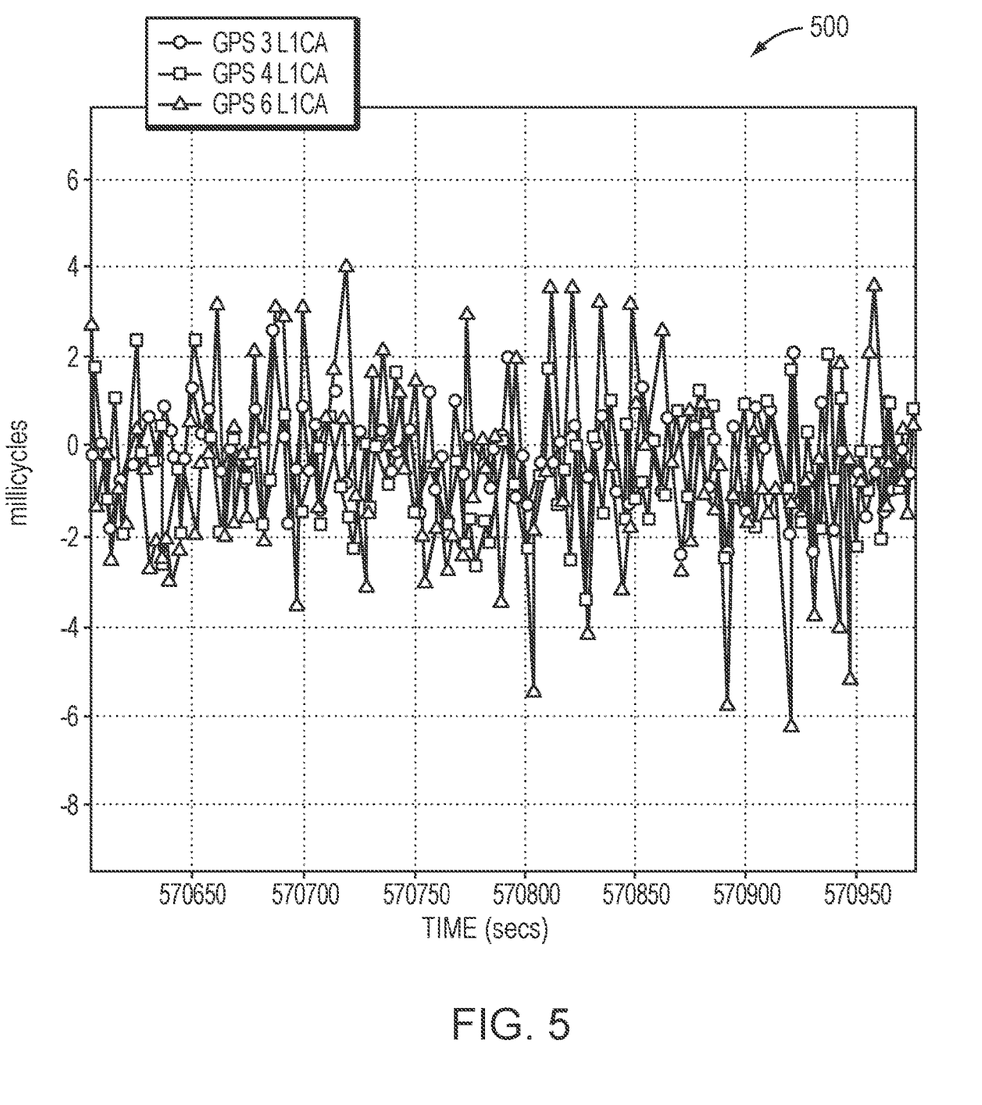
FIG. 5 is a graph illustrating the results of double differencing of carrier phase measurements for spoofing NSS signals in accordance with an illustrative embodiment of the present invention.

FIG. 5 shows the results of double differencing carrier-phase measurements in the spoofing case, the integer part of carrier phase measurements after the double differencing process has been removed. As shown, the double difference of carrier phase measurements plot in case of spoofing signals are zero-mean time in variant.

As discussed before, in the case of spoofing signals all PRNs would have the same $\Delta\Phi_{2-1}$ values resulting in zero $\nabla\Delta\Phi_{2-1}^{j-m}$ whereas authentic signals arriving from different angles will have non-zero $\nabla\Delta\Phi_{2-1}^{j-m}$. This is not the case in all situations and there are cases in the authentic scenario that double difference of carrier phase measurements of authentic signals are within the threshold and cannot be authenticated.

Figure 6:
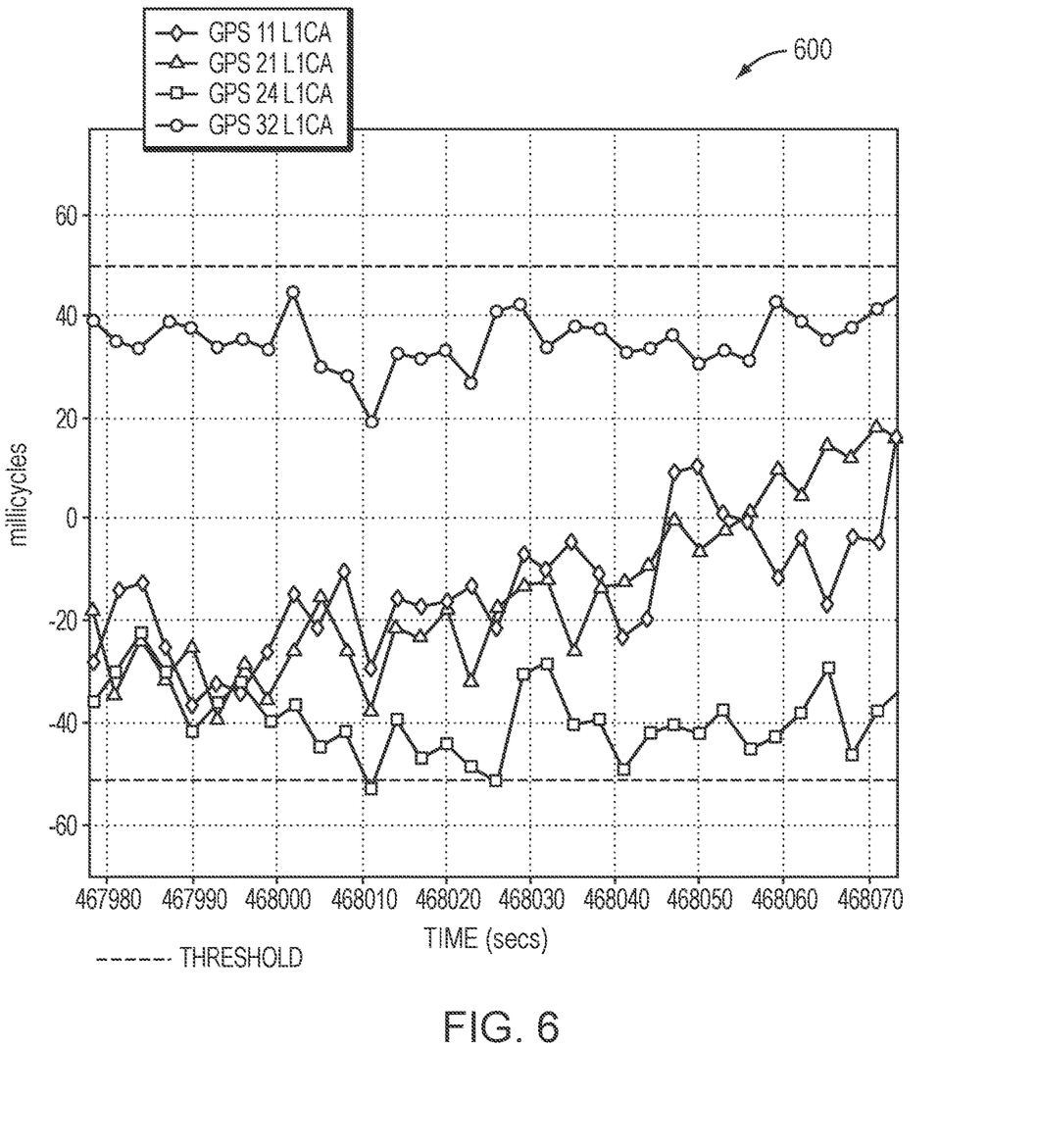
FIG. 6 is a graph illustrating the results of double differencing of NSS signals illustrating PRNs being below a detection threshold in accordance with an illustrative embodiment of the present invention.

FIG. 6 shows double difference of carrier phase measurements for 4 PRNs that showing high correlation. Considering the results of FIG. 6, double difference of carrier phase measurements for PRN 11, 21, 24 and 32 is correlated with that of the reference PRN and the spoofing detector may mistakenly classify these PRNs as spoofing ones. This is due to cone of ambiguity of a dual antenna configuration. Since the antenna baseline is only 15 cm the double difference of carrier phase measurements de-correlates very slowly and authentication of all PRNs may take a long time.

In NSS differential processing usually one reference satellite is used for double difference processing. However, in the case of authenticity verification, all possible double difference cases must be considered. This is of special importance when the combination of spoofed and authentic signals is tracked by a receiver.

The problem with double difference carrier phase (DD-ADR) or double difference of carrier to noise density ratio ($CN_0$) (DD-$CN_0$) measurements for signal authenticity verification is that it will take some time for all PRNs to be authenticated. It is of interest to minimize the classification time. The focus is to classify the authentic and spoofing signals in a mixed tracking condition where the receiver may track combination of authentic and spoofing signals. As shown, in actual operation conditions, some of the PRNs will be authenticated in a few epochs. If we assume that the receiver is tracking either authentic or spoofing signals, by authenticating a few PRNs, all of the PRNs can be authenticated. However, this assumption might not be valid in actual attack scenarios and the receiver may track a combination of authentic and spoofed PRNs. Hence, authentication of PRNs is required.

For PRNs generated from a single navigation system (i.e., authentic or spoofing sources) in nominal operation conditions, the measured ranges should converge to a single position solution. Considering this fact, a method has been proposed to check if the tracked PRNs belong to one system or not. The detection method places PRNs into two groups, namely Group A (Authenticated) and Group B (Authenticating). The authenticated PRNs are those that have passed the DD-ADR/DD-$CN_0$ threshold test.

There are several cases that may occur. In an exemplary first case, within a predefined time T, the system has authenticated four (4) or more PRNs. Illustratively, T may be on the order of several seconds; however, it is expressly contemplated that other timeout lengths may be utilized in accordance with alternative embodiments of the present invention. Therefore, the description of predefined time T being on the order of several seconds should be taken as exemplary only.

Once four or more PRNs are authenticated within time T, the receiver position is calculated using PRNs in Group A. An authenticity verification weighting vector is defined as $$w_A = [w_1, w_2, \ldots, w_N]$$

where N is the number of all tracked PRNs including PRNs in Group A and B and $w_j$ takes a value between 0 and 1. In one exemplary embodiment, $w_j$ for the PRNs in Group A is 1 and $w_j$ for PRNs in Group B is 0. In another exemplary embodiment, $w_j$ for the PRNs in Group A take 1 and $w_j$ for the PRNs in Group B may take a value between 0 and 1. It should be noted that in alternative embodiments, differing weighting factors may be utilized. Therefore, the descriptions given herein should be taken as exemplary only.

Then the final weight used in position estimation is formed based on the element-wise multiplication of $w_A$ and $w_P$ as $$w = w_A \circ w_P$$

$w_P$ is the conventional position solution weighting vector and may be a function of the signal or emitter characteristics, for example, elevation angles, $C/N_0$, pseudorange standard deviation or any combination of them. Using this weighting, the PRNs in Group B are significantly de-weighted and have little or no effect on the position estimate.

Once the weighting vector is formed, the residuals are calculated for all the PRNs including PRNs in Group A and Group B. If the residual value of a PRN in Group B agrees with that of the PRNs in Group A, that PRN is marked as an authentic PRN. If the residual value of a PRN in Group B does not agree with that of the PRNs in Group A, that PRN is marked as a spoofed PRN.

To this end, the averaged residual values of PRNs in Group A, $r_A^{avg}$ is compared to the residual value of a PRN in Group B. If the residual difference of PRN i in Group B ($r_B^i$) is greater than a predefined threshold Th, that PRN is classified as a spoofed PRN.

$$|r_A^{avg} - r_B^i| > Th$$

Th can be set depending on the position accuracy and variance of the position estimate. Th for instance, can be 10 m for nominal range-based position solution.

In a second exemplary case, after a second predetermined time T2 elapses, there are no authenticated PRNs. In such case all the PRNs are classified as spoofing signals. Then the detector continuously monitors the measurements.

In a third exemplary case, after time T2 seconds, there are between 1 and 3 authenticated PRNs and 3 or less PRNs in Group B. In this case, the signals in Group A are classified as authentic and the signals in Group B as spoofed.

Figure 7:
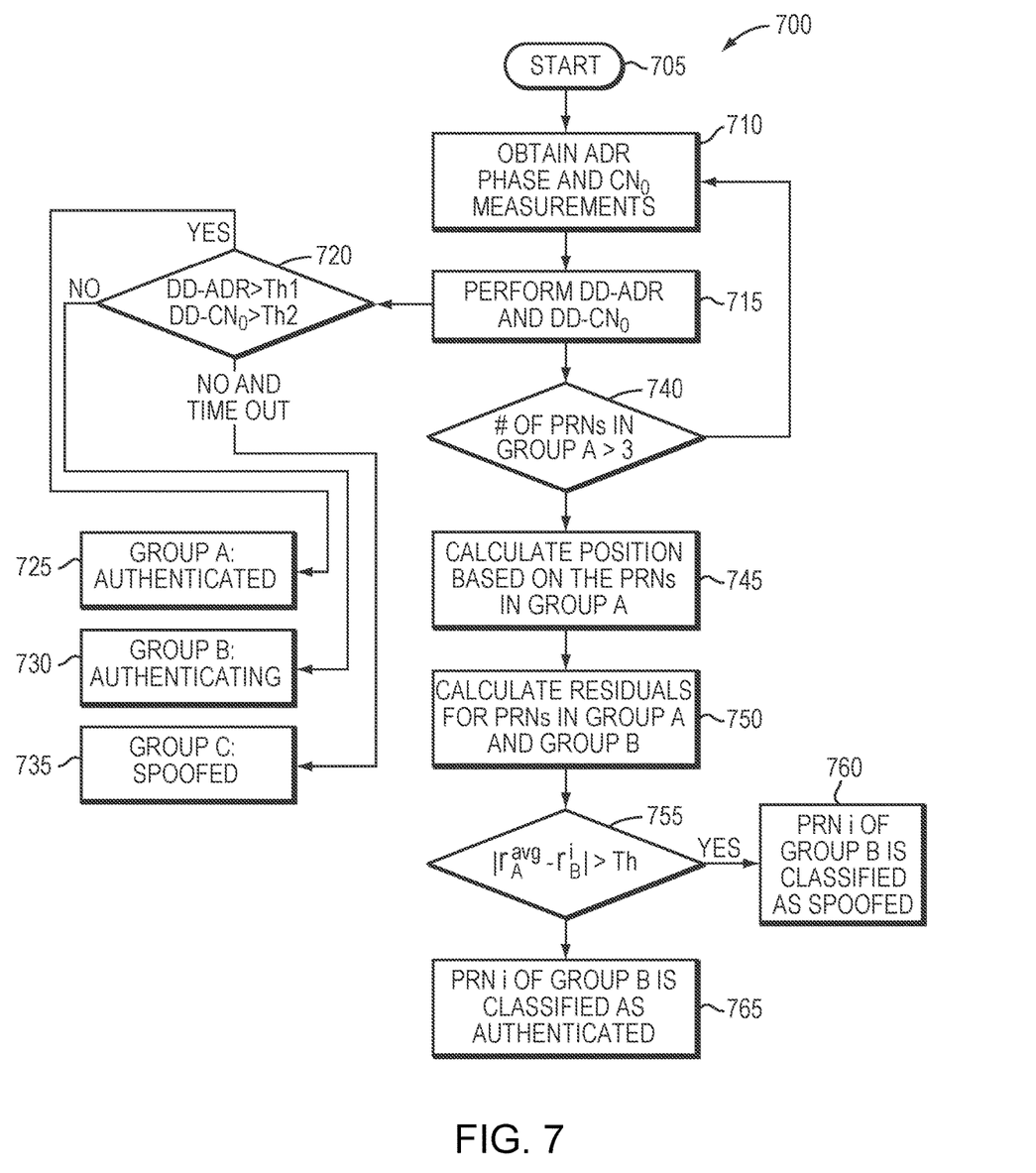
FIG. 7 is a flowchart detailing the steps of a procedure for authenticating PRNs in accordance with an illustrative embodiment of the present invention.

The first exemplary case is described below in more detail in relation to FIG. 7. FIG. 7 is a flowchart detailing the steps of an exemplary procedure 700 for determining whether a PRN is authentic or spoofed in accordance with an illustrative embodiment of the present invention. The procedure 700 begin in step 705 and continues to step 710 where the carrier phase observations and $CN_0$ measurements are obtained for the PRNs that are being tracked. These may be obtained using conventional techniques as are well known in the art. Once the carrier phase and $CN_0$ measurements are obtained, then in step 715 double differencing is performed on the carrier phase measurements (DD-ADR) and on the $CN_0$ measurements (DD-$CN_0$). Illustratively, all possible double differences are constructed considering PRN 1 to N−1 as reference PRNs as $$\nabla \Delta \Phi_{2-1}^{j-1} = \Delta \Phi_{2-1}^{j} - \Delta \Phi_{2-1}^{1}, j = 2, \ldots, N$$

$$\nabla \Delta \Phi_{2-1}^{j-2} = \Delta \Phi_{2-1}^{j} - \Delta \Phi_{2-1}^{2}, j = 3, \ldots, N$$

$$\vdots$$

$$\nabla \Delta \Phi_{2-1}^{j-N-1} = \Delta \Phi_{2-1}^{j} - \Delta \Phi_{2-1}^{N-1}, j = N$$

The same process is also repeated for $CN_0$ measurements.

The procedure moves to step 720 where a determination is made whether the double difference of the carrier phase observation (DD-ADR) and/or the double difference of $CN_0$ exceeds a predefined threshold. If they exceed the threshold, the PRN is placed (labelled) into Group A (Authenticated) in step 725. If they do not exceed the threshold, they are placed (labelled) into Group B (Authenticating) in step 730. However, if they do not exceed the threshold and a predefined time has elapsed, the PRN is placed (labelled) in Group C (Spoofed) in step 735.

If the time period has not expired, and there are not more than 3 PRNs in Group A, the procedure 700 loops from step 740 back to step 710 and the process repeats.

However, if in step 740 it is determined that there are four or more PRNs in Group A, i.e., they are authenticated, the procedure continues to step 745 where position is calculated using the authenticated PRNs, i.e., those from Group A. The residuals from the Group A and Group B PRNs are then calculated in step 750. The difference between the residuals of the authenticating PRNs (Group B) and the mean residuals of the authenticated PRNs (Group A) is compared with a predefined threshold in step 755. If the difference is not greater than the threshold, the procedure moves to step 765 and determines that PRN i of Group B is classified as authentic. Otherwise, the procedure moves to step 760 and determines that PRN i of Group B is classified as spoofed.

Various embodiments of the present invention have been disclosed. However, it is expressly contemplated that variations of the description may be utilized in accordance with the principles of the present invention. It is expressly contemplated that differing time periods may be utilized for making determinations in accordance with alternative embodiments of the present invention. Further, it is expressly contemplated that a Navigation Satellite System (NSS) may be a Global Navigation Satellite System (GNSS). Therefore, the description of a NSS should be expressly construed to include local, regional, and global navigation satellite systems. Further, it is expressly contemplated that the principles of the present invention may be utilized in a terrestrial based navigation system, and/or a hybrid system (e.g., mixed satellite and terrestrial). Therefore, the description of a NSS should be taken as exemplary only.

What is claimed is:

1. A computer implemented method comprising the steps of:
    receiving a set of navigation system (NS) signals at a plurality of antennas;
    for each NS signal of the set of NS signals, obtaining a carrier phase measurement and a carrier to noise density measurement;
    performing double differencing on the obtained carrier phase measurements to generate double difference carrier phase measurements and the obtained carrier to noise density measurements to generate double difference carrier to noise density measurements;
    determining whether each of the double difference carrier phase measurements exceeds a first predefined threshold and whether each of the double difference carrier to noise density measurements exceeds a second predefined threshold;
    labeling each NS signal of the set of NS signals as authentic when a particular double difference carrier phase measurement associated with the NS signal exceeds the first predefined threshold and a particular double difference carrier to noise density measurement associated with the NS signal exceeds the second predefined threshold;
    in response to at least a predefined number of NS signals of the set of NS signals being labeled as authentic, determining position using the set of NS signals;
    calculating a residual value for each NS signal of the set of NS signals labeled as authentic and each signal of the set of NS signals that is unauthenticated; and
    labeling an unauthenticated signal as authentic when an average of the residual values for the authentic signals is removed from the residual value for the unauthenticated signal to generate a remainder value that is not greater than a residual threshold.

2. The computer implemented method of claim 1 wherein determining position using the set of NS signals further comprises:
    generating a weighting vector that uses a first weighting factor for NS signals labeled as authentic and a second weighting factor for NS signals that are unauthenticated.

3. The computer implemented method of claim 2 wherein the first weighting factor is 1.

4. The computer implemented method of claim 2 wherein the second weighting factor is 0.

5. The computer implemented method of claim 2 wherein the first weighting factor is larger than the second weighting factor.

6. The computer implemented method of claim 1 further comprising: labeling the unauthenticated signal as spoofed when the average of the residual values for the authentic signals is removed from the residual value for the unauthenticated signal to generate the remainder value that is greater than the residual threshold.

7. The computer implemented method of claim 1 further comprising, in response to a time threshold elapsing with none of the NS signals being labeled as authentic, labelling each of the NS signals of the set of NS signals as spoofed.

8. The computer implemented method of claim 1 wherein the NS signals are Global Navigation Satellite Service (GNSS) signals.

9. The computer implemented method of claim 1 wherein the NS signals are from a plurality of terrestrial based transmitters.

10. A computer implemented method comprising the steps of:
    receiving a set of navigation system (NS) signals at a plurality of antennas;
    for each NS signal of the set of NS signals, obtaining a carrier to noise density measurement;
    performing double differencing of each of the obtained carrier to noise density measurements, wherein each possible double difference case is performed on the obtained carrier to noise density measurements;
    determining whether the double difference of each of the carrier to noise density measurements exceeds a second predefined threshold; and
    for each of the carrier to noise density measurements where the double difference exceeds the second predefined threshold, labeling the NS signal associated with the carrier to noise density measurement as authentic; and
    in response to at least a predefined number of NS signals of the set of NS signals being labeled as authentic, determining position using the set of NS signals.

11. A navigation system (NS) receiver, comprising:
    detection software executed by a processor, the detection software configured to:
        receive a set of NS signals at a plurality of antennas;
        obtain, for each NS signal of the set of NS signals, a carrier phase measurement and a carrier to noise density measurement;

perform, for all possible cases, double differencing on the obtained carrier phase measurements to generate double difference carrier phase measurements and the obtained carrier to noise density measurements to generate double difference carrier to noise density measurements;

determine whether each of the double difference carrier phase measurements exceeds a first predefined threshold and whether each of the double difference noise density measurements exceeds a second predefined threshold;

label each NS signal of the set of NS signals as authentic when a particular double difference carrier phase measurement associated with the NS signal exceeds the first predefined threshold and a particular double difference carrier to noise density measurement associated with the NS signal exceeds the second predefined threshold;

determine, in response to at least a predefined number of NS signals of the set of NS signals being labeled as authentic, position based on the set of NS signals using a weighting vector that uses a first weighting factor for NS signals labeled as authentic and a second weighting factor for NS signals that are unauthenticated;

calculate a residual value for each NS signal of the set of NS signals labeled as authentic and each signal of the set of NS signals that is unauthenticated; and label an unauthenticated signal as authentic when an average of the residual values for the authentic signals is removed from the residual value for the unauthenticated signal to generate a remainder value that is not greater than a residual threshold.

12. The NS receiver of claim 11 wherein when determining position using the set of NS signals, the detection software further configured to:
generate a weighting vector that uses a first weighting factor for NS signals labeled as authentic and a second weighting factor for NS signals that are unauthenticated.

13. The NS receiver of claim 11 wherein the detection software is further configured to: label the unauthenticated signal as spoofed when the average of the residual values for the authentic signals is removed from the residual value for the unauthenticated signal to generate the remainder value that is greater than the residual threshold.

14. The NS receiver of claim 11 wherein the detection software is further configured to: label, in response to a time threshold elapsing with none of the NS signals being labeled as authentic, each of the NS signals of the set of NS signals as spoofed.

* * * * *